US006884371B2

(12) United States Patent
Smith

(10) Patent No.: US 6,884,371 B2
(45) Date of Patent: Apr. 26, 2005

(54) METHOD OF MAKING RETROREFLECTIVE SHEETING AND ARTICLES

(75) Inventor: Kenneth L. Smith, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 119 days.

(21) Appl. No.: 10/404,235

(22) Filed: Apr. 1, 2003

(65) Prior Publication Data

US 2004/0174602 A1 Sep. 9, 2004

Related U.S. Application Data

(60) Provisional application No. 60/452,605, filed on Mar. 6, 2003.

(51) Int. Cl.[7] .............................................. B29D 11/00
(52) U.S. Cl. ........................ 264/1.9; 359/530; 359/900; 264/1.6
(58) Field of Search ........... 264/1.6, 1.9; 359/529–533, 359/900; 428/167–169, 172

(56) References Cited

U.S. PATENT DOCUMENTS

| | | | | |
|---|---|---|---|---|
| 1,591,572 | A | * | 7/1926 | Stimson |
| 3,684,348 | A | * | 8/1972 | Rowland |
| 3,689,346 | A | * | 9/1972 | Rowland |
| 3,712,706 | A | * | 1/1973 | Stamm |
| 3,811,983 | A | * | 5/1974 | Rowland |
| 3,926,402 | A | * | 12/1975 | Heenan |
| 4,025,159 | A | * | 5/1977 | McGrath |
| 4,478,769 | A | * | 10/1984 | Pricone et al. |
| 4,576,850 | A | * | 3/1986 | Martens |
| 4,588,258 | A | * | 5/1986 | Hoopman |
| 4,601,861 | A | * | 7/1986 | Pricone et al. |
| 5,067,432 | A | * | 11/1991 | Lippert |
| 5,117,304 | A | * | 5/1992 | Huang et al. |
| 5,156,863 | A | * | 10/1992 | Pricone et al. |
| 5,175,030 | A | * | 12/1992 | Lu et al. |
| 5,183,597 | A | * | 2/1993 | Lu |
| 5,885,490 | A | * | 3/1999 | Kawaguchi et al. |
| 5,961,846 | A | * | 10/1999 | Borchardt et al. |
| 5,981,032 | A | * | 11/1999 | Smith et al. |
| 6,015,214 | A | * | 1/2000 | Heenan et al. |
| 6,159,407 | A | * | 12/2000 | Krinke et al. |
| 6,257,860 | B1 | * | 7/2001 | Luttrell et al. |
| 6,280,822 | B1 | * | 8/2001 | Smith et al. |
| 6,287,670 | B1 | * | 9/2001 | Benson et al. |
| 6,322,652 | B1 | * | 11/2001 | Paulson et al. |
| 6,540,367 | B1 | * | 4/2003 | Benson et al. ............... 359/530 |

FOREIGN PATENT DOCUMENTS

| | | |
|---|---|---|
| EP | 0 844 056 | 5/1998 |
| WO | WO 95/11464 | 4/1995 |
| WO | WO 00/60385 | 10/2000 |

OTHER PUBLICATIONS

ASTM D–4956–01a; Standard Specification for Retroreflective Sheeting for Traffic Control.

* cited by examiner

Primary Examiner—James Phan
(74) Attorney, Agent, or Firm—Carolyn A. Fischer

(57) ABSTRACT

The invention relates to a method of making retroreflective sheeting and other articles prepared from casting a moldable synthetic resin onto a tool having a microstructured surface.

16 Claims, 6 Drawing Sheets

METHOD OF MAKING RETROREFLECTIVE SHEETING AND ARTICLES

RELATED APPLICATIONS

This application claims priority to U.S. Patent Application Ser. No. 60/452,605 filed Mar. 6, 2003.

FIELD OF THE INVENTION

The invention relates to a method of making retroreflective sheeting prepared from casting a moldable synthetic resin onto a tool having a microstructured surface.

BACKGROUND OF THE INVENTION

Retroreflective materials are characterized by the ability to redirect light incident on the material back toward the originating light source. This property has led to the widespread use of retroreflective sheeting for a variety of traffic and personal safety uses. Retroreflective sheeting is commonly employed in a variety of articles, for example, road signs, barricades, license plates, pavement markers and marking tape, as well as retroreflective tapes for vehicles and clothing.

Two known types of retroreflective sheeting are microsphere-based sheeting and cube corner sheeting. Microsphere-based sheeting, sometimes referred to as "beaded" sheeting, employs a multitude of microspheres typically at least partially embedded in a binder layer and having associated specular or diffuse reflecting materials (e.g., pigment particles, metal flakes or vapor coats, etc.) to retroreflect incident light. Cube corner retroreflective sheeting typically comprises a thin transparent layer having a substantially planar front surface and a rear structured surface comprising a plurality of geometric structures, some or all of which include three reflective faces configured as a cube corner element.

Cube corner retroreflective sheeting is commonly produced by first manufacturing a master mold that has a structured surface, such structured surface corresponding either to the desired cube corner element geometry in the finished sheeting or to a negative (inverted) copy thereof, depending upon whether the finished sheeting is to have cube corner pyramids or cube corner cavities (or both). Known methods for manufacturing the master mold include pin-bundling techniques, direct machining techniques, and techniques that employ laminae.

In pin bundling techniques, a plurality of pins, each having a geometric shape such as a cube corner element on one end, are assembled together to form a master mold. U.S. Pat. No. 1,591,572 (Stimson) and U.S. Pat. No. 3,926,402 (Heenan) provide illustrative examples.

In direct machining techniques, a series of grooves are formed in the surface of a planar substrate (e.g. metal plate) to form a master mold comprising truncated cube corner elements. In one well known technique, three sets of parallel grooves intersect each other at 60 degree included angles to form an array of cube corner elements, each having an equilateral base triangle (see U.S. Pat. No. 3,712,706 (Stamm)). In another technique, two sets of grooves intersect each other at an angle greater than 60 degrees and a third set of grooves intersects each of the other two sets at an angle less than 60 degrees to form an array of canted cube corner element matched pairs (see U.S. Pat. No. 4,588,258 (Hoopman)). In direct machining, a large number of individual faces are typically formed along the same groove formed by continuous motion of a cutting tool. Thus, such individual faces maintain their alignment throughout the mold fabrication procedure. For this reason, direct machining techniques offer the ability to accurately machine very small cube corner elements. A drawback to direct machining techniques, however, has been reduced design flexibility in the types of cube corner geometries that can be produced, which in turn affects the total light return.

In techniques that employ laminae, a plurality of thin sheets (i.e. plates) referred to as laminae having geometric shapes formed on one longitudinal edge are assembled to form a master mold. Lamina techniques are generally less labor intensive than pin bundling techniques because fewer parts are separately machined. For example, one lamina typically comprises about 400–1000 individual cube corner elements in comparison to each pin comprising a single cube corner element. Illustrative examples of lamina techniques can be found in EP 0 844 056 A1 (Mimura); U.S. Pat. No. 6,015,214 (Heenan); U.S. Pat. No. 5,981,032 (Smith); U.S. Pat. No. 6,159,407 (Krinke) and U.S. Pat. No. 6,257,860 (Luttrell).

The base edges of adjacent cube corner elements of truncated cube corner arrays are typically coplanar. Other cube corner element structures, described as "full cubes" or "preferred geometry (PG) cube corner elements" typically comprise at least two non-dihedral edges that are not coplanar. Such structures typically exhibit a higher total light return in comparison to truncated cube corner elements. Certain PG cube corner elements may be fabricated via direct machining of a sequence of substrates, as described in WO 00/60385. However, it is difficult to maintain geometric accuracy with this multi-step fabrication process. Design constraints may also be evident in the resulting PG cube corner elements and/or arrangement of elements. By contrast, pin bundling and techniques that employ laminae allow for the formation of a variety of shapes and arrangements of PG cube corner elements. Unlike pin bundling, however, techniques that employ laminae also advantageously provide the ability to form relatively smaller PG cube corner elements.

After manufacturing a master mold the master mold is typically replicated using any suitable technique such as conventional nickel electroforming to produce a tool of a desired size for forming microstructured sheeting. Multi-generational positive and negative copy tools are thus formed, such tools having substantially the same degree of precise cube formation as the master. Electroforming techniques such as described in U.S. Pat. Nos. 4,478,769 and 5,156,863 (Pricone) as well as U.S. Pat. No. 6,159,407 (Krinke) are known. A plurality of replications are often joined together for example by welding such as described in U.S. Pat. No. 6,322,652 (Paulson). The resulting tooling may then be employed for forming cube corner retroreflective sheeting by processes such as embossing, extruding, or cast-and-curing, as known in the art.

For example, U.S. Pat. Nos. 3,684,348 and 3,811,983 describe retroreflective material and a method of making a composite material wherein a fluid molding material is deposited on a molding surface having cube corner recesses and a preformed body member applied thereto. The molding material is then hardened and bonded to the body member. The molding material may be a molten resin and the solidification thereof accomplished at least in part by cooling, the inherent nature of the molten resin producing bonding to the body member thereof. Alternatively, the molding material may be fluid resin having cross-linkable groups and the solidification thereof may be accomplished at least in part by cross-linking of the resin. The molding material may also be a partially polymerized resin formulation and wherein the solidification thereof is accomplished at least in part by polymerization of the resin formulation.

Various retroreflective sheeting comprising truncated cube corner arrays have been commercially successful such as retroreflective sheeting commercially available from 3M Company ("3M"), St. Paul, Minn. under the trade designation "3M Scotchlite Brand Reflective Sheeting 3990 VIP". Although described in the patent literature, retroreflective sheeting comprising an array of full cubes or PG cube corner elements has not been manufactured commercially or sold. In order to accommodate the commercial success of retroreflective sheeting comprising an array of full cubes or PG cube corner elements, industry would find advantage in improved methods of making retroreflective sheeting comprising such arrays.

SUMMARY OF THE INVENTION

A characteristic of certain tools for making retroreflective sheeting comprising an array of full cube or PG cube corner cavities is the presence of channels. The present inventor has found that the presence of such channel as well as the orientation of such channels relative to the direction of relative motion of the tool in comparison to the resin delivery system (e.g. the advancing tool) during manufacture of sheeting has a significant effect on the quality of the replication as well as the rate of manufacturing the sheeting. The present invention relates to a method of making retroreflective sheeting providing a tool comprising a cube corner microstructured surface with at least one channel, advancing the tool in a direction such that the channel is substantially parallel to the direction of the advancing tool, casting a moldable resin onto said tool surface, solidifying the resin forming a retroreflective sheet having a surface comprising cube corner elements; and removing the sheet from the tool.

In another embodiment, the invention discloses retroreflective sheeting comprising a pair of longitudinal peripheral edges and at least one row of PG cube corner microstructures and at least one channel extending substantially parallel to the row; wherein the channel is substantially parallel to the longitudinal peripheral edges of the sheeting. The longitudinal peripheral edges span the sheeting in its maximum dimension as manufactured. The sheeting is preferably provided in a roll-good.

In each of these embodiments the cube corner microstructures are preferably PG cube corner microstructures. The cube corner microstructures may be cavities or elements. The channel may be a primary groove channel comprising a first planar face and second planar face intersecting at a common vertex. Alternatively or in addition thereto, the channel may be a structured channel comprising a first face comprising cube corner faces and second face comprising opposing cube corner faces. Alternatively, the structured channel may comprise the intersection of opposing non-dihedral edges of opposing cube corner microstructures. Alternatively, or in addition thereto, the channel may be a cube cavity channel comprising a first planar face and a second structured face. The first planar face is preferably a replica of a primary groove face. A replica of a cube cavity channel provides cube corner elements. The resin may be a thermoplastic resin provided molten or provided in the form of sheet. The (e.g. thermosetting, radiation curable) resin may optionally be provided on a carrier web.

BRIEF DESCRIPTION OF THE DRAWINGS

In the several figures of the attached drawing, like parts bear like reference numerals, and.

DETAILED DESCRIPTION OF THE PREFERRED EMBODIMENTS

Figure 1:
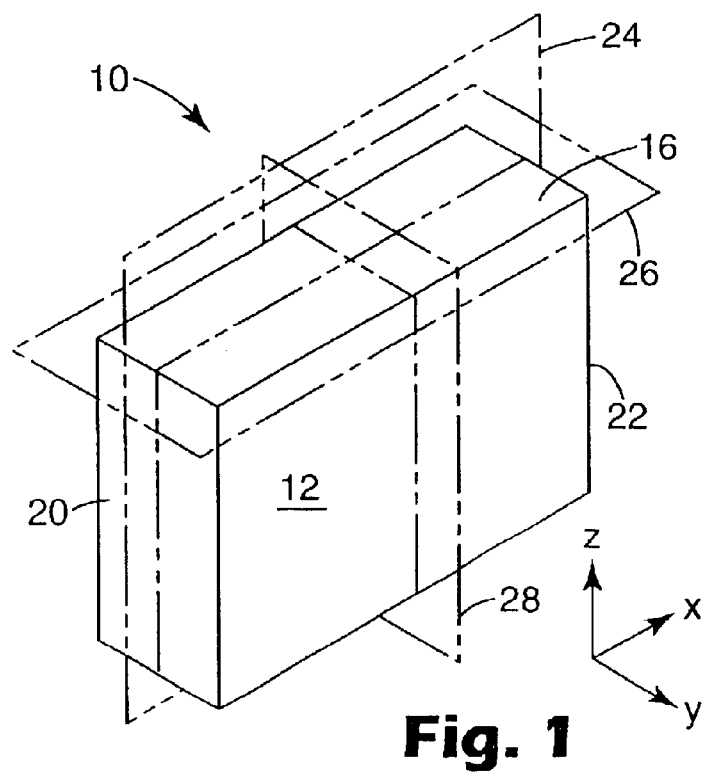
FIG. 1 is a perspective view of an exemplary single lamina prior to formation of cube corner microstructures.

The method and apparatus of the invention relate to making microstructured sheeting articles such as retroreflective sheeting.

As used herein, "sheeting" refers to a thin piece of polymeric (e.g. synthetic) material. The sheeting may be of any width and length, such dimension only being limited by the equipment (e.g. width of the tool, width of the slot die orifice, etc.) from which the sheeting was made. The thickness of retroreflective sheeting typically ranges from about 0.004 inches (0.1016 mm) to about 0.10 inches (2.54 mm). Preferably the thickness of retroreflective sheeting is less than about 0.020 inches (0.508 mm) and more preferably less than about 0.014 inches (0.3556 mm). In the case of retroreflective sheeting, the width is typically at least 30 inches (122 cm) and preferably at least 48 inches (76 cm). The sheeting is typically continuous in its length for up to about 50 yards (45.5 m) to 100 yards (91 m) such that the sheeting is provided in a conveniently handled roll-good. Additional layers such as seal films or overlays may also be utilized. Alternatively, however, the sheeting may be manufactured as individual sheets rather than as a roll-good. In such embodiments, the sheets preferably correspond in dimensions to the finished article. For example, the retroreflective sheeting, may have the dimensions of a standard U.S. sign (e.g. 30 inches by 30 inches (76 cm by 76 cm) and thus the microstructured tool employed to prepare the sheeting may have about the same dimensions. Smaller articles such as license plates or reflective buttons may employ sheeting having a correspondingly smaller dimension.

Figure 8:
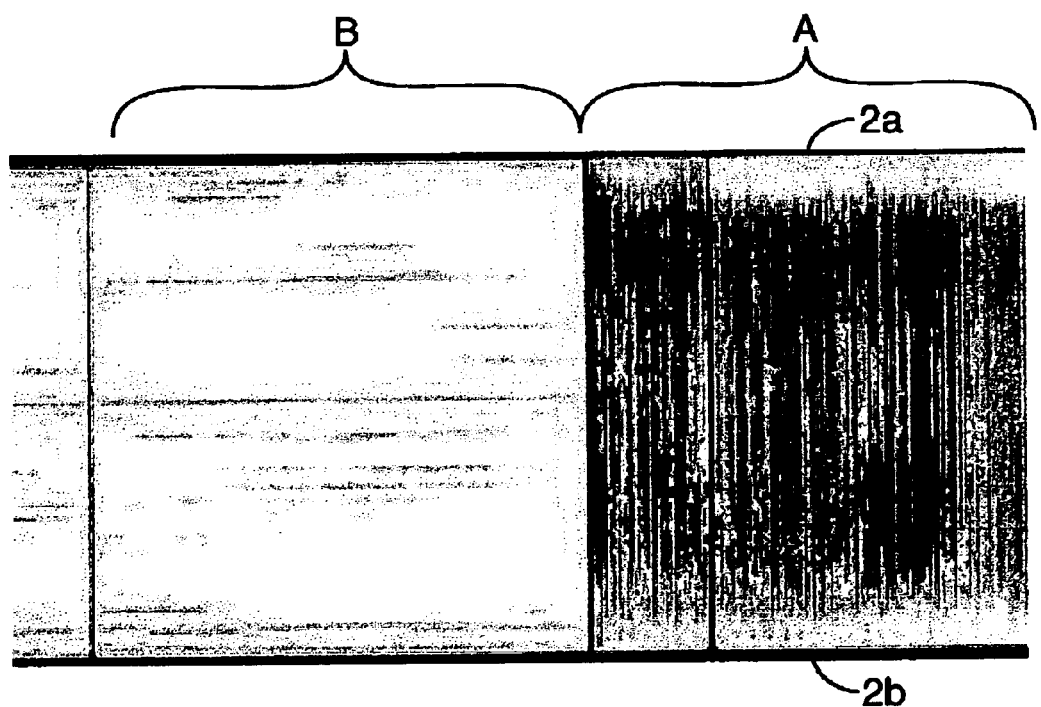
FIG. 8 depicts retroreflective sheeting prepared from tooling having down-web channels in comparison to cross-web channels.

Regardless of whether the retroreflective sheeting is provided as a roll-good or as a sheet, the sheeting comprises a pair of longitudinal peripheral edges such as depicted by 2a and 2b of FIG. 8. Such longitudinal peripheral edges typically span the sheeting in a maximum direction. Further the longitudinal peripheral edges are parallel with the direction of motion of the advancing tool and/or advancing moldable resin from the process in which the sheeting was made. Preferably, rows of PG cube corner elements are aligned parallel to these longitudinal peripheral edges.

As used herein, "microstructured" refers to at least one major surface of the sheeting comprising structures having a lateral dimension (e.g. distance between groove vertices of the cube corner structures) of less than 0.25 inches (6.35 mm), preferably less than 0.125 inches (3.175 mm) and more preferably less than 0.04 inches (1 mm). The lateral dimension, particularly of cube corner elements, is preferably less than 0.020 inches (0.508 mm) and more preferably less than 0.007 inches (0.1778 mm). The microstructures have an average height ranging from about 0.001 inches (0.0254 mm) to 0.010 inches (0.254 mm), with a height of less than 0.004 inches (0.1016 mm) being most typical. Further, the smallest lateral dimension of a cube corner microstructure us typically at least 0.0005 inches (0.0127 mm). Cube corner microstructures may comprise either cube corner cavities or, preferably, cube corner elements having peaks.

As used herein, "casting" refers to forming a moldable resin into a sheet having a microstructured surface by contacting the moldable resin with a microstructured mold surface. The moldable resin is preferably sufficiently fluid such that it may be extruded, pumped or poured onto a molding tool having the microstructured surface. The viscosity of the resin may vary widely. Polymerizable resins are often low to moderate viscosity liquids, whereas thermoplastic resins may be relatively viscous at the casting temperature. Alternatively the moldable resin may be provided in the form of a sheet that is contacted with an advancing embossing tool or by rolling bank processes that involve the contacting a coated carrier web with a tool.

The tool used herein is typically obtained by first manufacturing a master mold that has a microstructured surface. Method of manufacturing master molds are known. Master molds employed for making retroreflective sheeting are typically prepared from pin-bundling techniques, direct machining techniques, and techniques that employ laminae, as described in the art. The master mold for use in the invention is preferably derived from a laminae technique.

With reference to FIG. 1, lamina 10 includes a first major surface 12 and an opposing second major surface (not shown). Lamina 10 further includes working surface 16 and an opposing bottom surface extending between first major surface 12 and second major surface. Lamina 10 further includes a first end surface 20 and an opposing second end surface 22.

Lamina 10 can be characterized in three-dimensional space with the same superimposed Cartesian coordinate system. A first reference plane 24 is centered between major surfaces 12. First reference plane 24, referred to as the x-z plane, has the y-axis as its normal vector. A second reference plane 26, referred to as the x-y plane, extends substantially coplanar with working surface 16 of lamina 10 and has the z-axis as its normal vector. A third reference plane 28, referred to as the y-z plane, is centered between first end surface 20 and second end surface 22 and has the x-axis as its normal vector.

In the method of machining lamina comprising cube corner microstructures a first groove set, an optional second groove set, and preferably a third primary groove are formed with a groove-forming machine. As used herein, the term "groove set" refers to grooves formed in working surface 16 of the lamina 10 that range from being nominally parallel to non-parallel to within 1° to the adjacent grooves in the groove set. Alternatively or in addition thereto the grooves of the groove set may range from being nominally parallel to non-parallel to within 1° to particular reference planes as will subsequently be described. Accordingly, each characteristic with regard to an individual groove and or the groove of a groove set (e.g. perpendicular, angle. etc.) will be understood to have this same degree of potential deviation. Nominally parallel grooves are grooves wherein no purposeful variation has been introduced within the degree of precision of the groove-forming machine.

In general, the first groove set comprises a plurality of grooves having respective groove vertices that intersect the first major surface 12 and working surface 16 of lamina. Although working surface 16 may include a portion that remains unaltered (i.e. unstructured), it is preferred that working surface 16 is substantially free of unstructured surface portions.

The second groove set, (i.e. when present) comprises a plurality of grooves having respective groove vertices that intersect the first major surface and the working surface 16 of lamina. The first and second groove sets intersect approximately along a first reference plane 24 to form a structured surface including a plurality of alternating peaks and V-shaped valleys. Although not depicted, this embodiment may appear the same as the combination of lamina 200 and lamina 300 in FIG. 2.

Both the first and second groove sets may also be referred to herein as "side grooves". As used herein, side groove refers to an individual groove or a groove set wherein the groove(s) range from being nominally parallel to non-parallel within 1°, per their respective groove direction vectors, to at least one adjacent groove and preferably to all the grooves of the side groove set. The direction of a particular groove is defined by a vector aligned with the groove vertex. The groove direction vector may be defined by its components in the x, y, and z directions, the x-axis being perpendicular to reference plane 28 and y-axis being perpendicular to reference plan 24. Alternatively or in addition thereto, side groove refers to a groove that ranges from being nominally parallel to reference plane 28 to nonparallel to reference plane 28 to within 1°. Side grooves may optionally be perpendicular to reference plane 24 to this same degree of deviation. The side grooves may comprise small purposeful variations for the purpose of improving the retroreflected divergence profile such as included angle errors, and/or skew, and/or inclination. The advantages of skew and/or inclination are described in U.S. patent application Ser. No. 60/452,464 filed Mar. 6, 2003; incorporated herein by reference. U.S. patent application Ser. No. 60/452,464 was filed concurrently with U.S. patent application Ser. No. 60/452,605, to which the present application claims priority.

The lamina preferably comprises a primary groove face that extends substantially the full length of the lamina. Formation of a primary groove face results in a structured surface that includes a plurality of cube corner elements having three perpendicular or approximately perpendicular optical faces on the lamina. Typically, the intersection of such primary groove face with either working surface 12 or 14 is nominally parallel to reference plane 24 and 26. A single lamina may have a single primary groove face, a pair of groove faces on opposing sides and/or a primary groove along the intersection of working surface 16 with reference plane 24 that concurrently provides a pair of primary groove faces. A pair of single laminae with opposing orientations and preferably multiple laminae (e.g. four lamina identified as 100, 200, 300 and 400 in FIG. 2) with opposing orientations are typically assembled such that their respective primary groove faces form a primary groove 52, for example as depicted with reference to FIG. 2.

To form a master tool of suitable size for forming retroreflective sheeting, a plurality of toolings (also referred to as tiles) are formed by electroplating the surface of the master tool to form negative copies, subsequently electroplating the negative copies to form positive copies, electroplating the positive copies to form a second generation negative copies, etc. The positive copy has the same cube corner element structure as the master tool, whereas the negative copy is the cube cavity replica. Accordingly, a negative copy tool (e.g. FIG. 3) is employed to make a positive copy (i.e. cube corner element) sheeting whereas, a positive copy tool (e.g. FIG. 2) is employed to make a negative copy (i.e. cube corner cavity) sheeting. Tiling such toolings together can then assemble a master tool of the desired size. In the present invention the toolings are typically tiled in the same orientation such that the channels are substantially continuous between joined tooling portions.

Regardless of the manner is which the tool was derived and regardless of whether the tool comprises cube corner element microstructures wherein the faces intersect at a peak or cube corner cavity microstructures wherein the replication thereof forms a cube corner element, the tool employed in the method of the invention comprises at least one and typically a plurality of channels. The channels are typically parallel to the rows of the cube corner microstructures (e.g. the cube corner microstructures formed on individual laminae).

Figure 2:
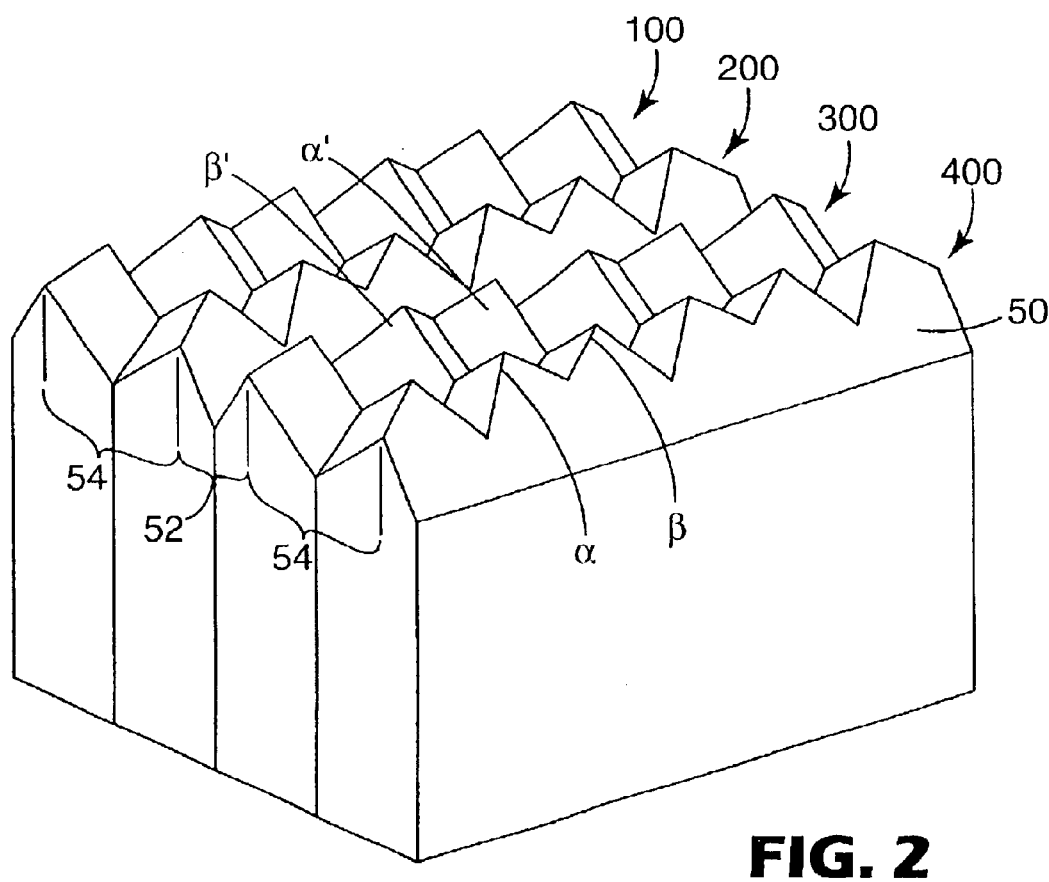
FIG. 2 is a perspective view of a master tool comprising four laminae comprising cube corner elements microstructures.

In one aspect, the channel is defined by a primary groove. As depicted in FIG. 2, a primary groove channel 52 is typically created by a pair of adjacent primary groove faces. Alternatively or in addition thereto, a primary groove channel may be present along the intersection of working surface 16 with reference plane 24 per FIG. 1. The primary groove faces typically intersect forming a line. This intersection may also be referred to as a vertex. Primary groove channels differ from grooves formed by direct machining of truncated cube corner arrays. In one aspect, the vertex of any one direct-machined groove of truncated cube corner arrays is typically intersected by grooves of other groove sets (e.g. formed at 60° to a first groove set) and groove faces are not continuous. In contrast, the bottom portion (e.g. vertex) of a primary groove is typically not intersected by other grooves. Accordingly, the groove faces of truncated cube corner arrays comprise a plurality of opposing triangular faces, whereas primary groove faces comprise non-triangular faces such as pentagons. In a truncated cube corner arrays the tool comprises a plurality of elements or a plurality of cavities, but not both in the same tool. In contrast, tools comprising full cube or PG cube corner arrays have a combination of cavities (e.g. cube corner cavities and other cavities) and protrusions (e.g. cube corner elements and other structures). Typically, at least about 10% to as much as about 50% of the faces of the primary groove are continuous and above the groove vertex line.

In another aspect, in alternative or in addition to the presence of a primary groove channel(s), the tool may comprise a channel 54 and preferably a plurality of channels formed by the intersection of a pair of rows of microstructured elements such as microstructured elements having opposing orientations as depicted in FIG. 2. Channels of this type will be referred to as "structured channels" herein. Such structured channels may be present between primary groove channels. Further, such structured channels are typically parallel to the primary groove channel. For example, the tool may have primary groove channels alternated with structured channels as depicted in FIG. 2. Structured channels do not intersect at a linear line. Rather the intersection typically comprises a plurality of line segments formed by peaks and valleys, such as peaks and valleys alternating in a repeating pattern. The faces of the structured channels preferably comprise cube corner faces (e.g. from adjacent rows of cubes formed on adjacent laminae).

Figure 3:
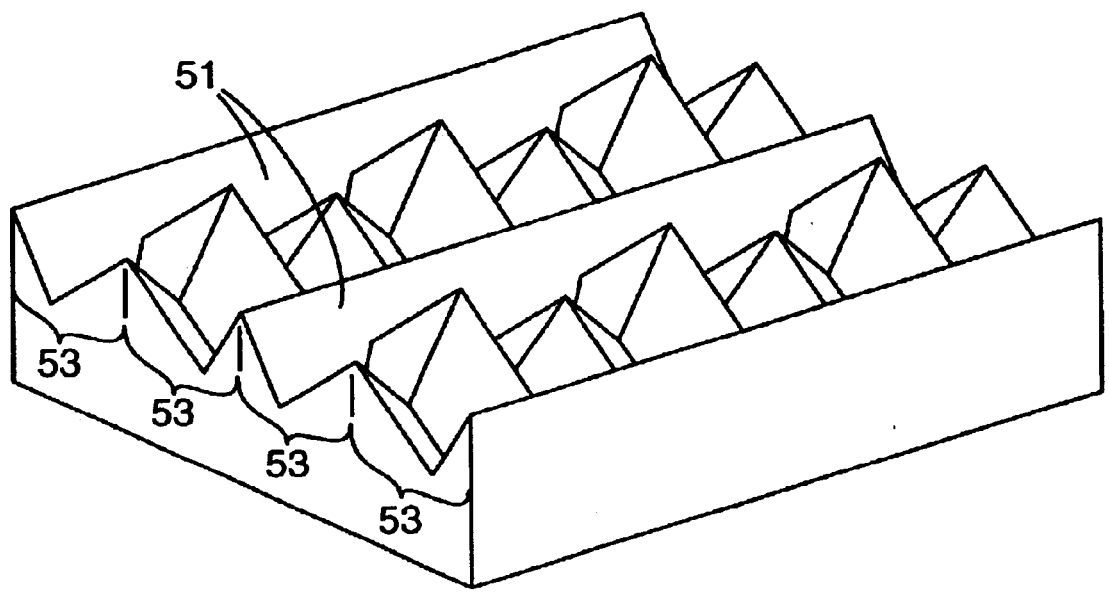
FIG. 3 is a perspective view of a tool that is a replica of the master tool of FIG. 2 comprising cube corner cavity microstructures.

Since the retroreflective sheeting is a replica of the tool, the tool of FIG. 2 produces cube corner microstructures comprising cube corner cavities. Accordingly, retroreflective sheeting comprising cube corner element microstructures are derived from a tool comprising cube corner cavities as depicted in FIG. 3. The channels 53 of this type of tool differ from that of the channels of FIG. 2. In this embodiment, each of the channels generally comprises a substantially continuous planar face 51. This face may preferably be derived from the replication of a primary groove face. Alternatively, this face may result from the replication of a portion of a major surface (e.g. 12 of FIG. 1). Alternatively, this face may be discontinuous wherein the face is interrupted by structures intersecting with such face. The second face of the channel is typically a structured face. In contrast to the structured face depicted in FIG. 2, the structures of the second face of FIG. 3 as depicted on the tool are not cube corner elements structures. However, the channel formed between planar face 51 and the second structured face forms a cube corner cavity, meaning that the replication of the cavity forms cube corner elements (e.g. in a row). Thus, these channels may be referred to a cube corner cavity channels.

Channels can be further characterized with respect to a ratio of the depth of a channel relative the overall height of the microstructured surface, i.e. distance along the z-axis between the highest and lowest points of the microstructures. Although this ratio can vary, the ratio is preferably greater than about 0.4 (e.g. 0.5, 0.6, 0.7, 0.8, 0.9, approaching 1) to obtain good replication at speeds of at least 10 feet/min.

In general, there is typically at least one channel for each row of elements. Each channels typically extends the entire length of a lamina, entire length of a row of cubes, the entire dimension of an array, or the entire length of the sheeting. However, at minimum, the channels extend for a length of at least about 10× its width, preferably at least 100× its width and more preferably at least 500× its width. Regardless of the type of channel, i.e. primary groove channel, structured channel, or cube corner cavity channel, the method of the invention employs providing the tool in a delivery system (e.g. dispensing device such as a slot die apparatus) such that a major portion of such channels and preferably substantially the totality of the channels are substantially parallel to the relative motion of the tool in comparison to the delivery system, i.e. direction of the advancing tool and/or advancing dispensing apparatus. Substantially parallel as it relates to the direction or orientation of the channels relative to the direction of filling of the channel refers to the acute angle formed by these two directions. Preferably, the orientation of the channel(s) does not vary from 0° by more than 20°, and more preferably by no more than 10° (e.g. 9°, 8°, 7°, 6°), and most preferably by no more than 5° (e.g. 5°, 4°, 3°, 2°, 1°). The method of the invention is described with reference to the use of a slot die apparatus as a dispensing means for providing the moldable (e.g. fluid) resin. As used herein, "slot die apparatus" refers to an apparatus comprising a cavity that includes a resin distribution portion, the arrangement of which can be of various designs (e.g. coat hanger, T-slot, etc.), wherein the cavity terminates in a slot orifice provided between a pair of die lips. The slot orifice is typically rectangular. Slot die apparatus are typically equipped with various other components such as adjusting bolts, electrical heaters, thermocouples, etc. as are known in the art. The dimensions of the slot orifice may vary. For example the width may vary from 0.010 inches to 0.1 inches, whereas the length may vary from 2 inches to 60 inches (i.e. width of the coating line).

Other dispensing apparatus may alternatively be employed in place of the exemplary slot die apparatus described herein. For example one or more needle delivery system may be employed. Further the moldable resin may alternatively be provided as a sheet that is contact with an embossing tool (i.e. at least one of which is advancing) or the moldable resin may be provided on a carrier web such as in the case of rolling bank processes. Depending on the dispensing apparatus, the orifice may be in close proximity to the tool surface or somewhat removed.

For example, the tool may be employed as an embossing tool to form retroreflective articles, such as described in U.S. Pat. No. 4,601,861 (Pricone). Alternatively, the retroreflective sheeting can be manufactured as a layered product by casting the cube-corner elements against a preformed film as taught in PCT application No. WO 95/11464 and U.S. Pat. No. 3,684,348, or by laminating a preformed film to preformed cube-corner elements.

The method of making retroreflective sheeting via casting a hardenable fluid synthetic resin, in the absence of the invention described herein is generally known from for example U.S. Pat. No. 3,811,983 (Rowland); U.S. Pat. No. 3,689,346 (Rowland); and U.S. Pat. No. 5,961,846 (Benson Jr.).

Figure 4A:
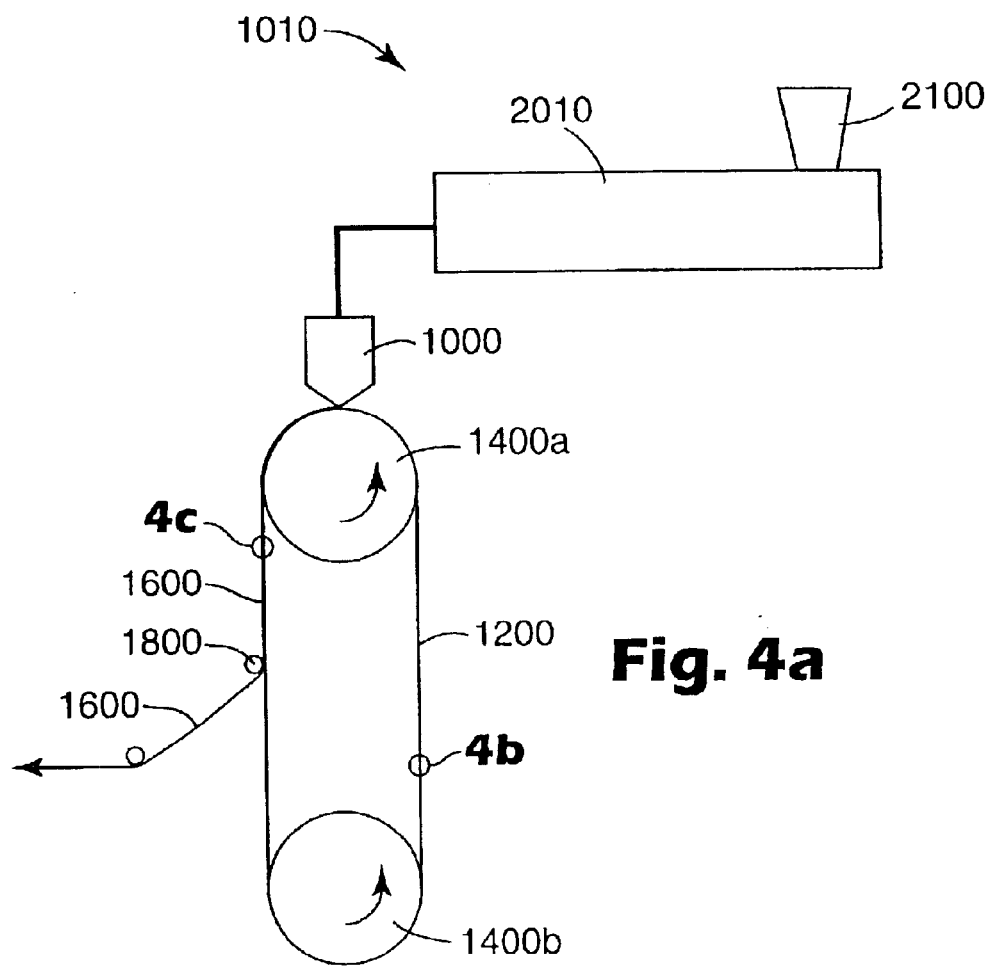
FIG. 4a is a side view of an exemplary method of extruding molten polymeric resin onto a tool with a slot die according to the present invention.
Figure 4B:
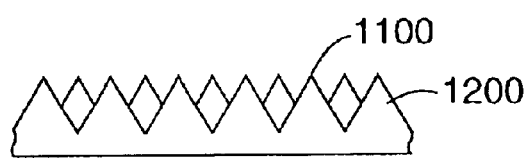
FIG. 4b is an enlarged view of the tool.
Figure 4C:
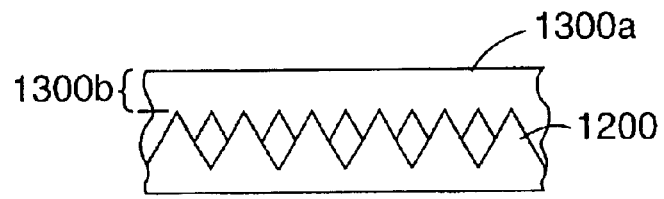
FIG. 4c is an enlarged view of the resin on the tool.

With reference to FIGS. 4a–4c, a representative manufacturing apparatus and process 1010 includes advancing a tool 1200 having a microstructured surface 1100, by means for example of drive rolls 1400a and/or 1400b; casting a fluid synthetic resin onto the microstructured surface of the tool with a slot die apparatus 1000; allowing the resin to sufficiently harden (i.e. solidify) while in contact with the tool forming a sheet 1600; and removing the sheet from the tool. In the case of continuous production, the leading edge of the sheeting is removed from the tool surface with for example stripper roll 1800. The direction of filling of the tool is the direction of relative motion 310 of the tool relative to the delivery system (e.g. slot die apparatus). Accordingly, in FIG. 4a–4c, the direction of filling is normal to the orifice of the dispensing apparatus.

Although the slot die apparatus and advancing tool are depicted in a vertical arrangement, horizontal or other arrangements (i.e. angles between horizontal and vertical) may also be employed. Regardless of the particular arrangement, the slot die apparatus provides the fluid resin to the microstructured tool at the orifice of the slot die apparatus, preferably in a direction normal to the tool. In addition, the manufacturing process may include multiple slot die apparatus arrangements. For example, a first slot die apparatus may be provided to partially fill the cube cavities followed by a second slot die provided to fill the remainder of the cavity.

The die is mounted in a substantial mechanical framework that is capable of being moved towards the advancing tool surface by suitable means such as jackscrews or hydraulic cylinders. Alternatively, the die may be stationary and the advancing tool surface moved towards the die. When the die is about 0.020 inches from the tool, the fluid synthetic resin (e.g. molten thermoplastic polymeric material) contacts the tool forming a continuous layer of the resin on the microstructured tool surface. The gap between the slot die apparatus and the tool surface is typically less than about two times that of the final sheeting thickness. Accordingly, the gap ranges from about 0.004 inches to 0.030 inches when producing sheeting with a nominal thickness of 0.0025 inches to 0.015 inches.

The resin is of a viscosity such that it flows, optionally with applied vacuum, pressure, temperature, ultrasonic vibration, or mechanical means, into the cavities in the molding surface. It is preferably applied in sufficient quantity that it substantially fills the cavities. In a preferred embodiment, the fluid resin is delivered at a rate such that the final land thickness of the sheeting (i.e. the thickness excluding that portion resulting from the replicated microstructure, 1300b in FIG. 4c) is between 0.001 and 0.100 inches and preferably between 0.003 and 0.010 inches. With reference to FIG. 4c, the surface 1300a of the resin (e.g. solidified) opposing the tool surface is generally smooth and planar. Alternatively, however, the resin may be delivered in a manner such that the cube cavities alone are filled and thus the sheeting is substantially free of a land layer. In this embodiment the cube corner elements are typically bonded to a film layer prior to removal from the tool surface.

In the case of extrusion of molten thermoplastic resins, the resin is typically initially provided in a solid pellet form and poured into hopper 2100 that continuously feeds the resin into a melt extruder 2000. Heat is typically supplied to the tool by passing over the drive roll 1400A that is heated for example with circulating hot oil or by electric induction to maintain a tool surface temperature above the softening point of the polymer. Suitable cooling means such as spraying water onto the extruded resin or tool, contacting the unstructured surface of the tool with cooling rolls, or direct impingement air jets provided by high-pressure blowers are provided after extrusion to sufficiently harden the resin such that it may be removed from the tool.

In the case of polymerizable resins, the resin may be poured or pumped directly into a dispenser that feeds slot die apparatus 1000. For embodiments wherein the polymer resin is a reactive resin, the method of manufacturing the sheeting further comprises curing the resin in one or more steps. For example the resin may be cured upon exposure to a suitable radiant energy source such as actinic radiation, ultraviolet light, visible light, etc. depending upon the nature of the polymerizable resin to sufficiently harden the resin prior to removal from the tool. Combinations of cooling and curing may also be employed.

Figure 5:
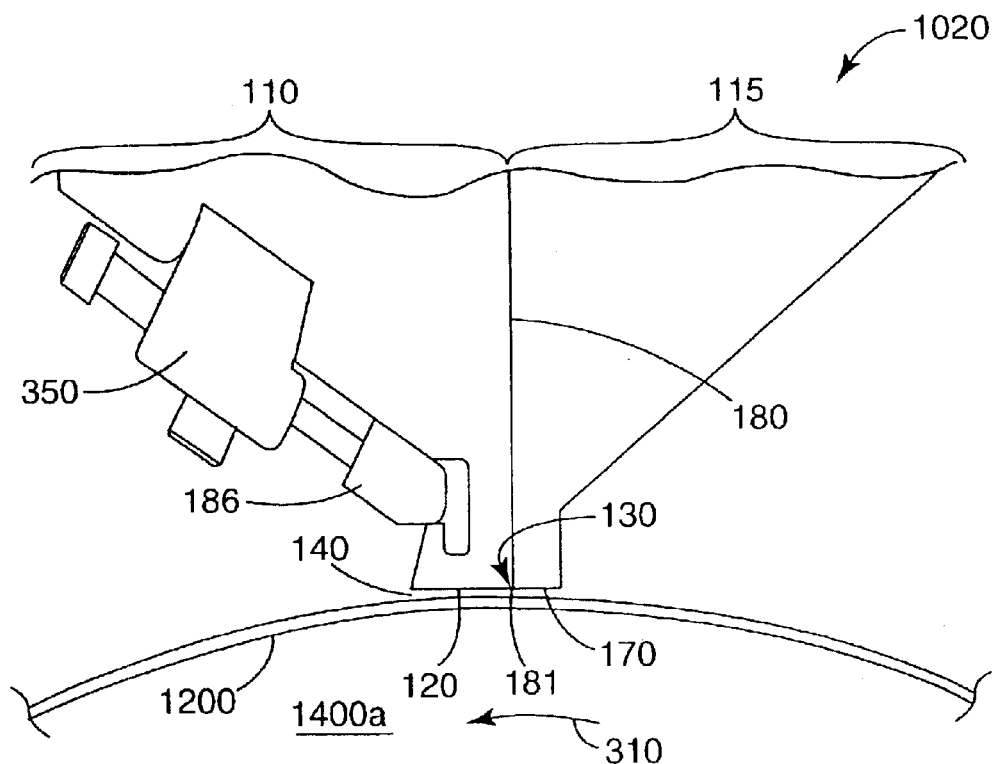
FIG. 5 is a side view of an exemplary slot die apparatus for use in the method of the invention.
Figure 6:
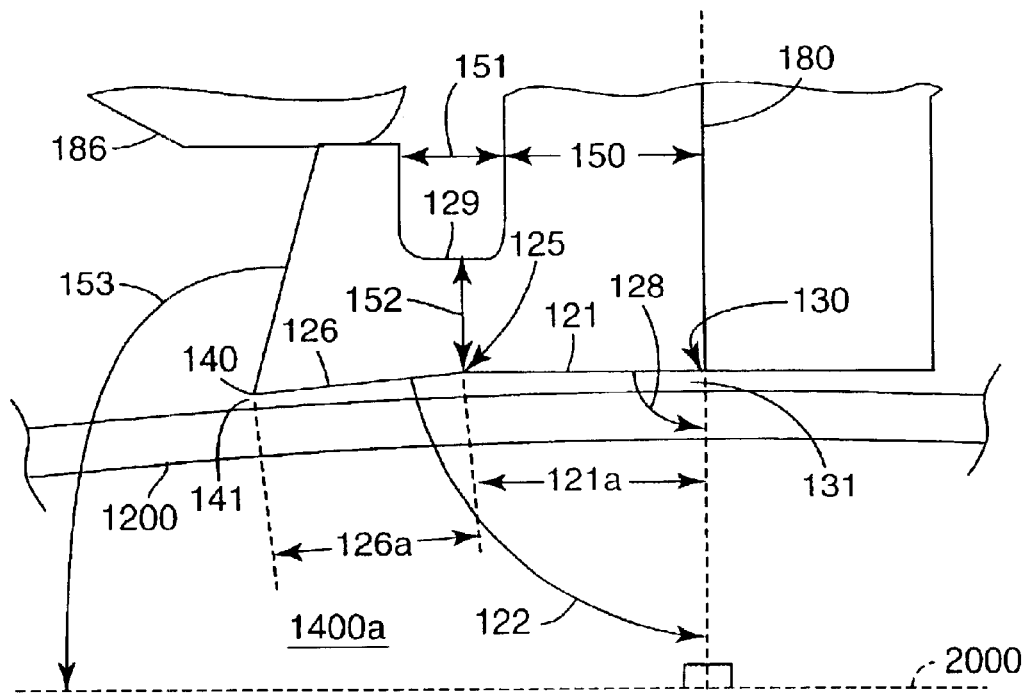
FIG. 6 depicts a detailed side view of an exemplary slot die apparatus for use in the present invention.
Figure 7A:
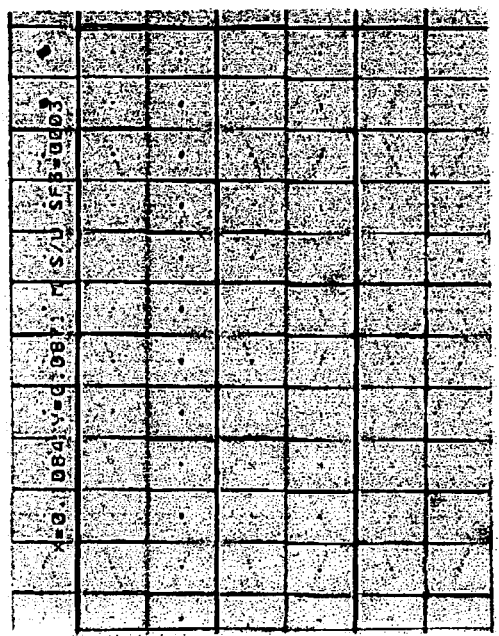
FIGS. 7a–7d depict photographs of retroreflective sheeting prepared with an exemplary method and exemplary slot die apparatus of the invention.
Figure 7B:
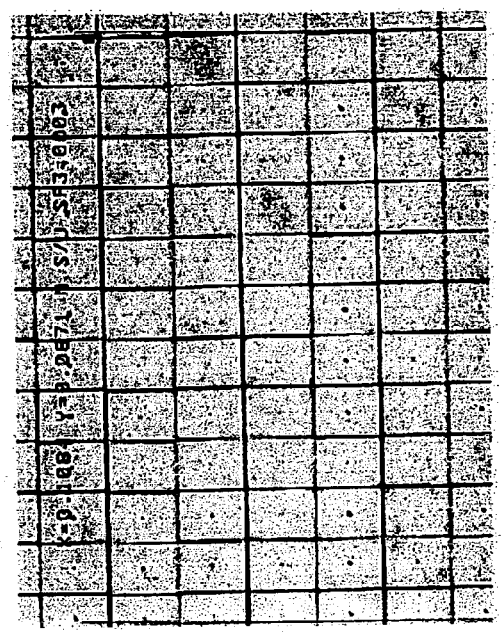
Figure 7C:
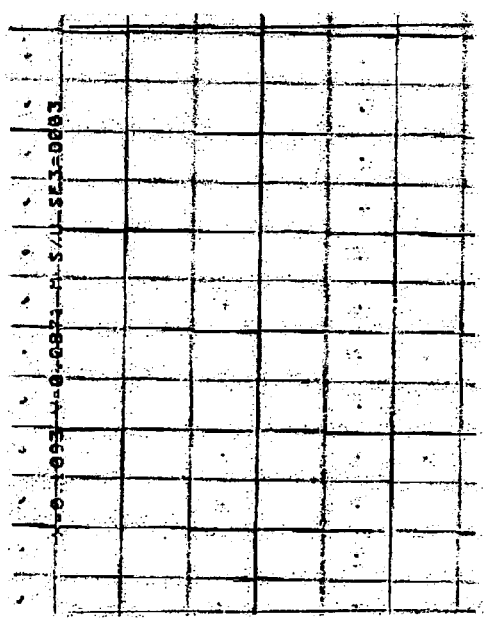
Figure 7D:
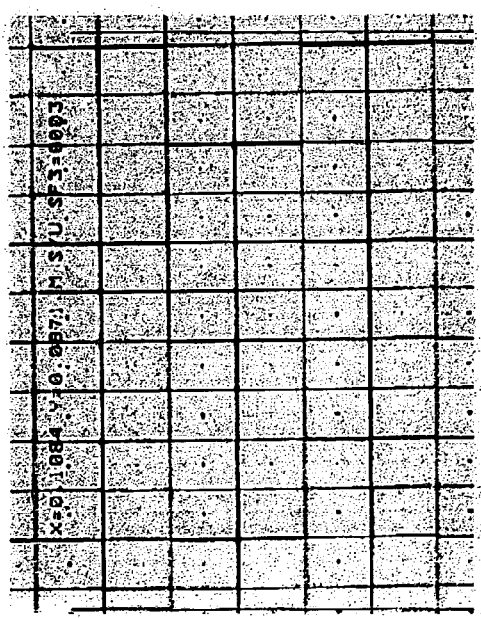

With reference to FIGS. 5–6, an exemplary slot die apparatus 1020 for use in the invention comprises two portions, a first die portion 110 and a second die portion 115. The first and second die portions are joined together at the die parting line 180 creating a slot cavity (not shown) having a rectangular slot orifice 181. Adjacent to the slot orifice 181 and downstream of it relative to the direction of rotation 310 of roll 1400a, is a first die lip 120, also referred to herein as the downstream lip. Adjacent to the slot orifice 181, and upstream of it relative to the direction of rotation 310 of roll 1400a, is a second die lip 170, also referred to herein as the upstream lip. These lips are brought into close proximity to the continuously advancing moving tool 1200 having a microstructured surface. The drive roll 1400*a* is built to resist high die loading forces while maintaining overall roll surface deflection of less than 0.001 inches over the working face of the roll.

Figure 9A:
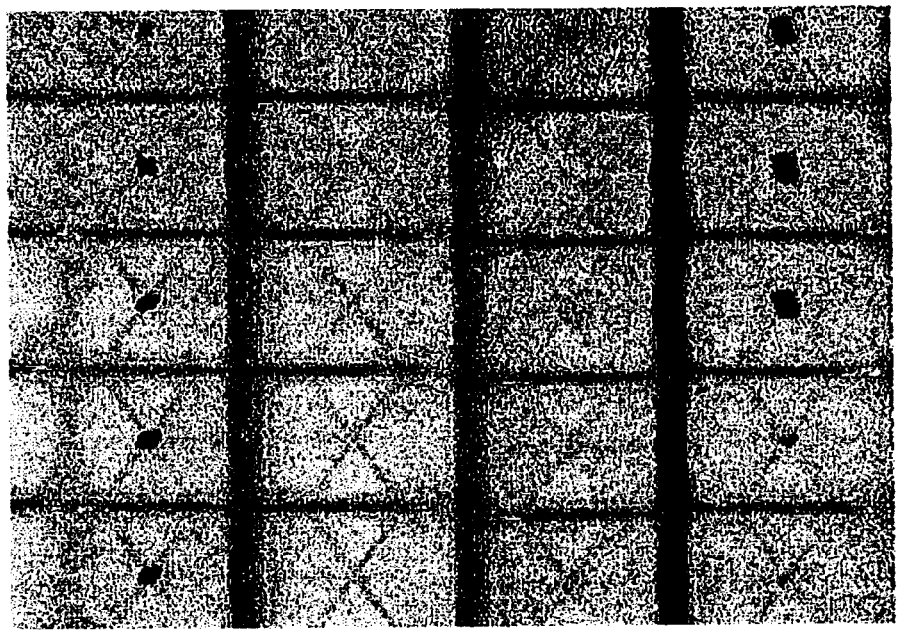
FIG. 9a depicts a photograph of retroreflective sheeting manufactured wherein the channels were oriented crossweb (i.e. perpendicular) relative to the direction of motion of the tool.
Figure 9B:
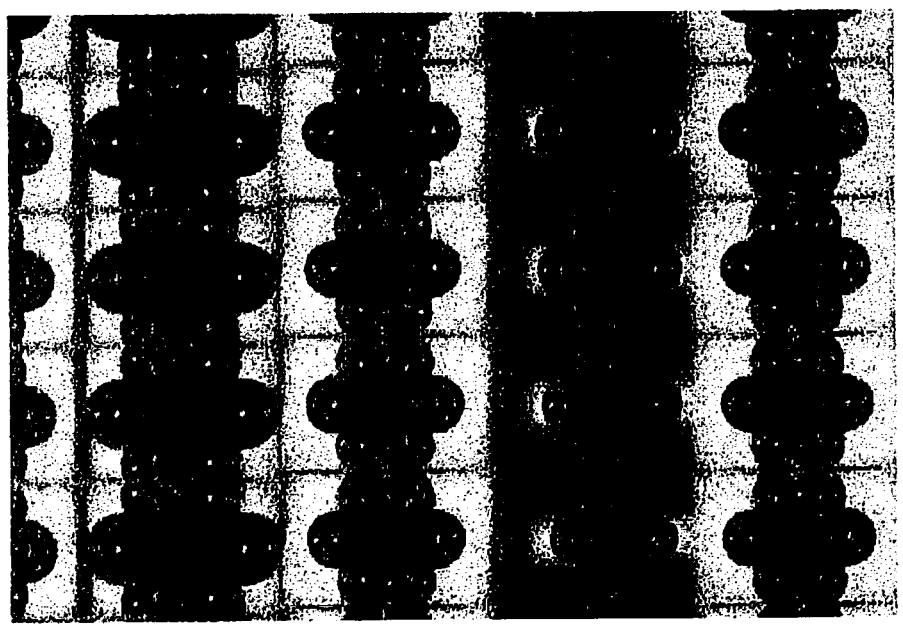
FIG. 9b depicts a photograph of retroreflective sheeting manufactured wherein the channels were orientated down-web (i.e. perpendicular) relative to the direction of motion of the tool.

In the method of the present invention, the tool and/or moldable resin is advanced and thus provided such that the channels (i.e. primary groove channels and/or structured channels and/or cube corner cavity channel) of the tool are substantially parallel to the direction of the advancing tool. In doing so the channels of the tool are preferably substantially normal to the slot orifice of the slot die apparatus. The present inventor has discovered that providing the tool to the dispensing apparatus in a manner wherein the channels are perpendicular to the direction of the advancing tool results in poor tool filling. Poor tool filling is evident by the sheeting having an irregular appearance in plan view such as cross-web striations as depicted by portion A of FIG. 8 rather than being substantially free of such irregularities as depicted by portion B of FIG. 8. Upon viewing the sheeting with a microscope, it is evident that portion A has substantial unfilled inclusions as depicted in FIG. 9*b*, whereas the percentage of unfilled inclusions in FIG. 9*a* are less than 1%. Portion A of FIG. 8 would also exhibit poor (if any) retroreflected brightness due to the severity of the cube corner element defects.

Methods of machining laminae and forming a master tooling from laminae are known, such as described in U.S. Pat. No. 6,257,860 (Lutrell et al.). For embodiments wherein the side grooves are substantially free of skew and/or inclination, side grooves may be formed in a plurality of stacked laminae, such as described in U.S. Pat. No. 6,257,860 (Lutrell et al.) and U.S. Pat. No. 6,159,407 (Krinke et al.). A preferred method for forming grooves on the edge of individual lamina (e.g. lamina having side grooves comprising skew and/or inclination), assembling the laminae, and replicating the microstructured surface of the assembled laminae is described in U.S. patent application Ser. No. 10/383,039 filed Mar. 6, 2003; incorporated herein by reference. U.S. patent application Ser. No. 10/383,039 was concurrently filed with U.S. patent application Ser. No. 60/452,605, to which the present application claims priority. Such methods describe machining cube corner microstructures on an exposed edge surface portion of the lamina, (i.e. working surface 16 with reference to FIG. 1) by forming a plurality of V-shaped grooves with a groove-forming machine.

A lamina is a thin plate having length and height at least about 10 times its thickness (preferably at least 100, 200, 300, 400, 500 times its thickness). The lamina(e) are not limited to any particular dimensions. One of ordinary skill in the art appreciates the optimal dimensions of the lamina are related to the flexural stiffness of the lamina, buckling stiffness, and ease of handling. Furthermore, optimal dimensions may also be constrained by the optical requirements of the final design (e.g. cube corner structures). The lamina typically has a thickness of less than 0.25 inches (6.35 mm) and preferably less than 0.125 inches (3.175 mm). The thickness of the lamina is preferably less than about 0.020 inches (0.508 mm) and more preferably less than about 0.010 inches (0.254 mm). Typically, the thickness of a lamina is at least about 0.001 inches (0.0254 mm) and more preferably at least about 0.003 inches (0.0762 mm). Such laminae range in length from about 1 inch (25.4 mm) to about 20 inches (5.08 cm) and are typically less than 6 inches (15.24 cm). The height of a lamina typically ranges from about 0.5 inches (12.7 mm) to about 3 inches (7.62 cm) and is more typically less than about 2 inches (5.08 cm).

In general, the lamina may be comprised of any substrate suitable for forming directly machined grooves on the edge. Suitable substrates machine cleanly without burr formation, exhibit low ductility and low graininess and maintain dimensional accuracy after groove formation. A variety of machinable plastics or metals may be utilized. Suitable plastics comprise thermoplastic or thermoset materials such as acrylics or other materials. Machinable metals include aluminum, brass, copper electroless nickel, and alloys thereof. Preferred metals include non-ferrous metals. Suitable lamina material may be formed into sheets by for example rolling casting chemical deposition, electro-deposition or forging. Preferred machining materials are typically chosen to minimize wear of the cutting tool during formation of the grooves. Other materials may also be suitable for lamina comprising other types of microstructures.

The V-shaped grooves are preferably formed with a diamond-tooling machine that is capable of forming each groove with fine precision. Moore Special Tool Company, Bridgeport, Conn.; Precitech, Keene, N.H.; and Aerotech Inc., Pittsburg, Pa., manufacture suitable machines for such purpose. Such machines typically include a laser interferometer-positioning device. A suitable precision rotary table is commercially available from AA Gage (Sterling Heights, Mich.); whereas a suitable micro-interferometer is commercially available from Zygo Corporation (Middlefield, Conn.) and Wyko (Tucson, Ariz.) a division of Veeco. The precision (i.e. point to point positioning) of the microstructure (e.g. groove vertices spacing and groove depth) is preferably at least as precise as +/−500 nm, more preferably at least as precise as +/−250 nm and most preferably at least as precise as +/−100 nm. The precision of the groove angle is at least as precise as +/−2 arc minutes (+/−0.033 degrees), more preferably at least as precise as +/−1 arc minute (+/−0.017 degrees), even more preferably at least at precise as +/−½ arc minute (+/−0.0083 degrees), and most preferably at least as precise as +/−¼ arc minute (+/−0.0042 degrees) over the length of the cut (e.g. the thickness of the lamina). Further, the resolution (i.e. ability of groove forming machine to detect current axis position) is typically at least about 10% of the precision. Hence, for a precision of +/−100 nm, the resolution is at least +/−10 nm. Over short distances (i.e. 10 adjacent parallel grooves), the precision is approximately equal to the resolution. In order to consistently form a plurality of grooves of such fine accuracy over duration of time, the temperature of the process is maintained within +/−0.1° C. and preferably within +/−0.01° C.

The diamond tools suitable for use are of high quality such as diamond tools that can be purchased from K&Y Diamond (Mooers, N.Y.) or Chardon Tool (Chardon, Ohio). In particular, suitable diamond tools are scratch free within 0.010 inches (0.254 mm) of the tip, as can be evaluated with a 2000× white light microscope. Typically, the tip of the diamond has a planar portion ranging in size from about 0.00003 inches (0.000762 mm) to about 0.00005 inches (0.001270 mm). Further, the surface finish of suitable diamond tools preferably have a roughness average of less than about 3 nm and a peak to valley roughness of less than about 10 nm. The surface finish can be evaluated by forming a test cut in a machinable substrate and evaluating the test cut with a micro-interferometer, such as can be purchased from Wyko (Tucson, Ariz.), a division of Veeco.

The method may employ a variety of dispensing apparatus for casting the moldable (e.g. fluid) resin onto the microstructured tool surface. Suitable dispensing apparatus include the slot die apparatus described in U.S. Pat. No.

5,067,432 (Lippert) as well as slot die apparatus commercially available from Extrusion Dies, Inc., Chippewa Falls, Wis. under the trade designations "Ultracoat" and "Ultraflex". In some embodiments the method of the invention further employs the methods and apparatus described in Ser. No. 10/382,375, titled "Method of Making Retroreflective Sheeting and Slot Die Apparatus", filed on the same day as the present application, incorporated herein by reference.

With reference to FIG. 6 an exemplary die comprises a downstream lip having a total length of about 1.0 inch (e.g. 0.88 inches) having two surface portions. The first surface portion extends from the leading edge 130 to the trailing edge of the first surface portion 125 (i.e. also the leading edge of the second surface portion and the line of adjacency for the two surface portions) having a length 121a of 0.41" and an angle 128 of 89.2° degrees to vertical as measured counterclockwise from the lip surface to an extrapolation of die parting line 180, as depicted in FIG. 6. The second surface portion extends from the trailing edge of the first surface portion 125 having a length 126a of 0.47" and an angle 122 of 86.8° degrees to vertical as measured counterclockwise from the lip surface to an extrapolation of die parting line 180, as depicted in FIG. 3. Further, the downstream lip comprises sufficient structural strength to resist flexing or deflection due to the high pressure developed between the lip surface portions and the advancing tool.

The method of the invention is suitable for use with any microstructure design, e.g. cube corner element design comprising primary grooves and/or microstructured channels and/or cube corner cavity channels as previously described. Since the tool is provided such that a major portion of the channels are substantially parallel to the direction of the advancing tool, in the case of roll-goods the channels is also substantially parallel to the longitudinal edges, i.e. maximum dimension, of the sheet.

The retroreflective sheeting preferably comprises an array of cube corner microstructures wherein at least a portion and preferably substantially all the cube corner elements of the lamina(e) and retroreflective sheeting are full cubes that are not truncated. In one aspect, the base of full cube elements are not triangular. In another aspect, the non-dihedral edges of full cube elements are characteristically not all in the same plane (i.e. not coplanar). Such cube corner elements are preferably "preferred geometry (PG) cube corner elements". Full-cube and PG cube corner elements typically exhibit a higher total light return in comparison to truncated cube corner elements.

A PG cube corner element may be defined in the context of a structured surface of cube corner elements that extends along a reference plane. For the purposes of this application, a PG cube corner element means a cube corner element that has at least one non-dihedral edge that: (1) is nonparallel to the reference plane; and (2) is substantially parallel to an adjacent non-dihedral edge of a neighboring cube corner element. A cube corner element whose three reflective faces comprise rectangles (inclusive of squares), rectangles, quadrilaterals, trapezoids pentagons, or hexagons are example of PG cube corner elements. "Reference plane" with respect to the definition of a PG cube corner element refers to a plane or other surface that approximates a plane in the vicinity of a group of adjacent cube corner elements or other geometric structures, the cube corner elements or geometric structures being disposed along the plane. In the case of a single lamina, the group of adjacent cube corner elements consists of a single row or pair of rows. In the case of assembled laminae, the group of adjacent cube corner elements includes the cube corner elements of a single lamina and the adjacent contacting laminae. In the case of sheeting, the group of adjacent cube corner elements generally covers an area that is discernible to the human eye (e.g. preferably at least 1 mm$^2$) and preferably the entire dimensions of the sheeting.

Suitable resin compositions for the retroreflective sheeting of this invention are preferably transparent materials that are dimensionally stable, durable, weatherable, and readily formable into the desired configuration. Examples of suitable materials include acrylics, which have an index of refraction of about 1.5, such as Plexiglas brand resin manufactured by Rohm and Haas Company; polycarbonates, which have an index of refraction of about 1.59; reactive materials such as thermoset acrylates and epoxy acrylates; polyethylene based ionomers, such as those marketed under the brand name of SURLYN by E. I. Dupont de Nemours and Co., Inc.; (poly)ethylene-co-acrylic acid; polyesters; polyurethanes; and cellulose acetate butyrates. Polycarbonates are particularly suitable because of their toughness and relatively high refractive index, which generally contributes to improved retroreflective performance over a wider range of entrance angles. Injection molding grade polycarbonate having a melt flow rate ranging from 17 g/10 min. to 24 g/10 min. (ASTM D1238 or ISO 1133-1991; condition 300/1.2) is typically preferred. These materials may also include dyes, colorants, pigments, UV stabilizers, or other additives. Although transparent synthetic resins are employed in the manufacture of retroreflective sheeting, in the case of other microstructured articles, the synthetic resin may be opaque or translucent as well.

In the case of molten polymeric resins, the resin typically solidifies as a function of sufficient cooling. For example, polycarbonate sufficiently cools upon reaching a temperature of about 240° F. or lower. Cooling can be achieved by any means including by spraying water onto the extruded resin or tool, contacting the unstructured surface of the resin or tool with cooling rolls, or my means of direct impingement air jets provided by high-pressure blowers.

Other illustrative examples of materials suitable for forming the array of cube corner elements are reactive resin systems capable of being cross-linked by a free radical polymerization mechanism by exposure to actinic radiation, for example, electron beam, ultraviolet light, or visible light. Additionally, these materials may be polymerized by thermal means with the addition of a thermal initiator such as benzoyl peroxide. Radiation-initiated cationically polymerizable resins also may be used. Reactive resins suitable for forming the array of cube corner elements may be blends of photoinitiator and at least one compound bearing an acrylate group. Preferably the resin blend contains a monofunctional, a difunctional, or a polyfunctional compound to ensure formation of a cross-linked polymeric network upon irradiation.

Illustrative examples of resins that are capable of being polymerized by a free radical mechanism that can be used herein include acrylic-based resins derived from epoxies, polyesters, polyethers, and urethanes, ethylenically unsaturated compounds, isocyanate derivatives having at least one pendant acrylate group, epoxy resins other than acrylated epoxies, and mixtures and combinations thereof. The term acrylate is used here to encompass both acrylates and methacrylates. U.S. Pat. No. 4,576,850 (Martens) discloses examples of crosslinked resins that may be used in cube corner element arrays of the present invention.

The manufacture of the sheeting may include other optional manufacturing steps prior to or subsequent to solidification of the sheeting. For example, the retroreflective sheeting can be manufactured as a layered product by casting the cube-corner elements against a preformed film as taught in PCT application No. WO 95/11464 and U.S. Pat. No. 3,684,348, or by laminating a preformed film to preformed cube-corner elements. In doing so the individual cube-corner elements are interconnected by the preformed film. Further, the elements and film are typically comprised of different materials.

Alternatively or in addition thereto, specular reflective coating such as a metallic coating can be placed on the backside of the cube-corner elements. The metallic coating can be applied by known techniques such as vapor depositing or chemically depositing a metal such as aluminum, silver, or nickel. A primer layer may be applied to the backside of the cube-corner elements to promote the adherence of the metallic coating.

In addition to or in lieu of a metallic coating, a seal film can be applied to the backside of the cube-corner elements; see, for example, U.S. Pat. Nos. 4,025,159 and 5,117,304. The seal film maintains an air interface at the backside of the cubes that enables total internal reflection at the interface and inhibits the entry of contaminants such as soil and/or moisture. Further a separate overlay film may be utilized on the viewing surface of the sheeting for improved (e.g. outdoor) durability or to provide an image receptive surface. Indicative of such outdoor durability is maintaining sufficient brightness specifications such as called out in ASTM D49560-1a after extended durations of weathering (e.g. 1 year, 3 years). Further the CAP Y whiteness is preferably greater than 30 before and after weathering.

The retroreflective sheeting is useful for a variety of uses such as traffic signs, pavement markings, vehicle markings and personal safety articles, in view of its high retroreflected brightness. The coefficient of retroreflection, $R_A$, may be measured according to US Federal Test Method Standard 370 at −4° entrance, 0° orientation, 0.2° observation is typically at least 100 candelas per lux per square meter (CDL), preferably at least 300 CDL and more preferably at least 600 CDL.

Patents, patent applications, and publications disclosed herein are hereby incorporated by reference (in their entirety) as if individually incorporated. It is to be understood that the above description is intended to be illustrative, and not restrictive. Various modifications and alterations of this invention will become apparent to those skilled in the art from the foregoing description without departing from the scope of this invention, and it should be understood that this invention is not to be unduly limited to the illustrative embodiments set forth herein.

EXAMPLES 1–4

Retroreflective sheeting was prepared utilizing a slot die apparatus that was substantially identical to a slot die apparatus commercially available from Extrusion Dies, Inc., Chippewa Falls, Wis. under the trade designation "Ultracoat" with the exceptions that the downstream die lip was changed to incorporate the following specific features: (1) the horizontal length of the lip was changed from 0.478" to 0.884"; (2) a section of the lip near the polycarbonate exit slot was thinned to provide a hinge in the horizontal section of the lip, thereby allowing the downstream portion of the lip to be adjusted in a vertical plane; (3) the polycarbonate contacting surface of this lip was machined to provide two planar surfaces, the first surface being at an angle of 89.2 degrees to vertical as measured counterclockwise from the tool surface to an extrapolation of the parting line of the die, and the second surface being 87.6 degrees to vertical counterclockwise as measured counterclockwise from the tool surface to an extrapolation of the parting line of the die; (4) die bolts were configured to push on the outboard or trailing section of the die lip, such that adjustments of the bolts resulted in a vertical displacement of the trailing lip while not substantially changing the polycarbonate slot between the front and rear die lips; (5) the lip was built from P-20 tool steel such that with reference to FIG. 3 dimension 150 had a thickness of 0.33 inches, dimension 151 had a thickness of 0.26 inches, dimension 152 had a thickness of 0.19 inches and angle 153 was 105° relative to reference plane 2000.

In operation, the die was mounted such that the parting line slot orifice was positioned horizontally 0.050" upstream of top dead center relative to a reference plane tangent to the roll at top dead center in a rigid framework having a die support beam and a jackscrew assembly for moving the die in a vertical plane so that it could be positioned at any distance from a heated roller. The jackscrew assembly was equipped with actuating motors on both sides of the support beam that were mounted with bolts to the die beam. The moving end of the jackscrew was threaded into a load cell that was bolted to the main support structure in a manner that the net load developed by the molten resin interacting with the die lips was transmitted through and sensed by the load cells. The load cells were connected to suitable electronics that provided a digital display of these die forces. The die was attached to a single screw extruder.

Injection molding grade polycarbonate having a melt flow rate ranging from 17 g/10 min. to 24 g/10 min. (ASTM D1238 or ISO 1133-1991; condition 300/1.2) was dried for 4 hours in a 250° F. drying hopper. The dried polycarbonate pellets were flood fed to the extruder inlet. The extruder barrel zone temperatures were set at 475° F. for Zone 1, 535° F. for Zone 2, 550° F. for Zone 3, 565° F. for Zone 4 and 570° F. for Zone 5. The gate exit zone temperature at the end of the extruder was set at 575° F. The polymer melt temperature and pressure were measured at the extruder gate using a melt thermocouple and a pressure probe respectively and are provided in TABLE 1. An adapter of 1.25 inch internal diameter (I.D.) connected the extruder gate and the die. The temperature on the adapter was set at 560° F. The die body was divided into 16 temperature zones, each temperature zone having approximately the same area. The downstream lip included sequential zones 1–8, whereas the upstream lip included sequential zones 9–16 with zones 1 and 16 being adjacent to one another yet on opposite sides of the slot orifice. The zone temperatures were set at 575° F. for Zones 1, 2, 7, 8, 9 and 10; 560° F. for Zones 3, 6, 11 and 14; 545° F. for Zones 4, 5, 12 and 13; and 570° F. for Zones 15 and 16.

The die was initially positioned so that the downstream lip was approximately 10 mils from the microprismatic surface of a tool (as will subsequently be described in greater detail) that consisted of the inverse of the desired microprismatic design of the retroreflective sheeting. The vertical position of the trailing die lip 126 was adjusted by turning all the die bolts ⅜ of one turn resulting in the trailing edge 140 of the second surface portion being 0.004" closer to the tool. The microprismatic surface was on a continuous metal belt that was set at the line speed provided in Table 1. The microprismatic surface of the tool was presented to the die by wrapping the belt around a continuously driven heated roller built to resist high die loading forces while maintaining overall roller surface deflection less than 1 mil over the working face of the roller having a diameter of 30 inches.

Heat was supplied to the roller by a hot oil system with a set point of 495° F. The tool surface temperature was measure with a contact pyrometer on both the left and right flat non-structured margins of the tooling as provided in TABLE 1.

The tool was about 20 feet in the downweb direction by about 3 feet in the crossweb direction. The tool included electroformed replications that were derived from a master mold consisting of an assembly of laminae having dimensions of about 2 inches by about 4 inches (i.e. length of microprismatic surface of each lamina). The method of machining the lamina as well as the method of assembling and replicating the assembled laminae is described in previously cited U.S. patent application Ser. No. 10/383,039 filed Mar. 6, 2003. The optical design formed in the lamina (e) is described in previously cited U.S. patent application Ser. No. 60/452,464. A primary groove face extending substantially the full lamina length was formed on each lamina. The primary groove face was oriented at roughly 35.49° to the normal vector defined by the plane of the tool surface. Alternating pairs of side grooves with included angles of substantially 75.226° and 104.774° were formed in each lamina with a spacing of 0.005625 inches to produce the remaining faces of the cube corner cavities. The symmetry axes of the cubes corner cavities were canted about 6.03° in a plane substantially parallel to reference plane 24. The side grooves were formed substantially orthogonal to the primary groove face. The term substantially with regard to the side groove (i.e. included angles and orthogonal) refers to the side groove comprising a combination of ½ angle errors, skew and inclination, each of which are less than 1° for the purpose of introducing multiple non-orthogonality to improve the retroreflected divergence profile. Further details concerning grooves comprising skew and/or inclination is found in previously cited Ser. No. 60/452,464. The combination of ½ angle errors, skew and inclination is not believed to affect the replication fidelity.

Since the tool surface is a negative replica of the assembled laminae, the tool comprises a plurality of substantially parallel cube corner cavity channels. The tool was provided to the slot die apparatus such the channel was normal to the slot orifice.

Photographs of retroreflective sheeting replicated from this tool are depicted in FIG. 7. The horizontal dimensions of the cube cavities in FIG. 7 is 0.0075 mils, corresponding to the thickness of the individual lamina. The trapezoidal cube corner cavities of individual lamina correspond to the vertical rows in FIG. 7.

Molten polycarbonate exited from the die orifice onto the microprismatic surface of the tooling to form a continuous web of microreplicated sheeting. The extruder output speed was adjusted to provide a 12 mil nominal caliper of the sheeting. The die force was measured by the load cells built into the supporting framework.

The belt and web continued from the curved surface of the roll into a flat free span zone and were then cooled by blowing air through impingement nozzles until a temperature of less than 240° F. was reached. The web was then removed from the belt and wound into a roll of retroreflective sheeting.

The replication fidelity of each retroreflective sheeting sample was evaluated by taking four 3"×5" samples from each of four locations across the web. Care was taken to ensure that the sixteen samples from each comparative example was taken from the same location. Each sample was laid under a microscope (Measurescope MM-11) at a 10× magnification and a photograph (camera was a Javelin SmartCam) was taken of the sample with the poorest replication. The photographs are depicted in FIG. 7a–7d. Poor replication would be evident by the presence of unfilled inclusions of the cube cavities that appear as black clusters at the center portion of each trapezoid, each trapezoid being the base edges of the cube corner element. The percentage of unfilled inclusions is approximated by measuring the surface area of the unfilled inclusions in plan view. A "pass" rating refers to 1% or less unfilled inclusions, whereas a "fail" rating refers to greater than 1% unfilled inclusions.

TABLE 1

| | Example No. | | | |
|---|---|---|---|---|
| | 1 | 2 | 3 | 4 |
| Line Speed (fpm) | 10 | 14 | 18 | 20 |
| Extruder Speed (rpm) | 7 | 9 | 11 | 13 |
| Extruder Gate Melt Temperature (° F.) | 561 | 563 | 561 | 561 |
| Slot Pressure (psi) | 886 | 730 | 785 | 661 |
| Extruder Gate Melt Pressure (psi) | 1789 | 1767 | 2164 | 2210 |
| Tool Temperature (° F.) | 425 | 405 | 400 | 398 |
| Die Force (pli) | 607 | 647 | 637 | 636 |
| Replication Fidelity | Pass | Pass | Pass | Pass |
| | FIG. 5a | FIG. 5b | FIG. 5c | FIG. 5d |
| | <1% loss | <1% loss | <1% loss | <1% loss |

Table 1 shows that each of Examples 1–4 exhibited good replication fidelity.

EXAMPLE 5 & COMPARATIVE EXAMPLE A

The same general procedure as described for Examples 1–4 was repeated with a different slot die apparatus wherein the total length of the downstream lip was 0.501 inches and the downstream lip comprised a single planar surface. The tool comprised cube corner cavity channels having cube cavities replicated from laminae forward canted by about 9.74°. The width of the cube cavities was 7.5 mils corresponding to the thickness of a lamina and the side groove spacing was 5.0 mils. The cube peak was centered between the side grooves and located 4.125 mils in plan view form the side of the lamina intersected by the primary groove surface. All side grooves having an included angle of substantially 90°. The primary groove face was oriented at roughly 45° to the normal vector defined by the plane of the tool surface.

In a first section of the tool, the tool was provided to the slot die apparatus such that the cube cavity channels were orientated crossweb relative to the direction of the advancing tool. Although the replication was good at speeds less than 5 feet per minute, the tool filling was poor at speeds greater than 5 feet per minute.

In a second section of the tool, the tool was provided to the slot die apparatus such that the cube cavity channels were orientated downweb (i.e. channel parallel to the direction of the advancing tool) relative to the direction of the advancing tool. The replication was good at a range of speeds up to about 28 feet per minute.

FIG. 8 depicts a photograph of retroreflective sheeting. Section A is a portion of the sheeting that was replicated at a rate of 11 feet/minute with the channels of the tool orientated crossweb, whereas Section B is a portion of the sheeting that was replicated using the same conditions except for the same tool being provided to the slot die orifice such that the channels of the tool were orientation downweb.

FIG. 9a depicts a photograph of the retroreflective sheeting of Section A, whereas FIG. 9b depicts a photograph of Section B. As shown in these photographs Section B had substantial unfilled inclusions.

What is claimed is:

1. A method of making retroreflective sheeting comprising:
   providing a tool comprising a PG cube corner microstructured surface with at least one channel;
   advancing the tool in a direction such that the channel is substantially parallel to the direction of the advancing tool;
   casting a moldable resin onto said tool surface;
   solidifying the resin forming a retroreflective sheet having a surface comprising cube corner elements; and
   removing the sheet from the tool.

2. The method of claim 1 wherein the cube corner microstructures are cavities.

3. The method of claim 1 wherein the cube corner microstructures are cube corner elements.

4. The method of claim 1 wherein the channel is a primary groove channel.

5. The method of claim 4 wherein the channel comprises a first planar face and second planar face intersecting at a common vertex.

6. The method of claim 1 wherein the channel is a structured channel.

7. The method of claim 6 wherein the channel comprises a first face comprising cube corner faces and second face comprising opposing cube corner faces.

8. The method of claim 6 wherein the channel comprises the intersection of opposing non-dihedral edges of opposing cube corner microstructures.

9. The method of claim 1 wherein the channel is a cube cavity channel.

10. The method of claim 9 wherein the channel comprises a first planar face and a second structured face.

11. The method of claim 9 wherein a replica of the channel provides cube corner elements.

12. The method of claim 10 wherein the first planar face is a replica of a primary groove face.

13. The method of claim 1 wherein the resin is a molten thermoplastic resin.

14. The method of claim 1 wherein the resin is a thermoplastic resin provided in the form of a sheet.

15. The method of claim 1 wherein the resin is provided on a carrier web.

16. A method of making retroreflective sheeting comprising:
   providing a tool comprising a cube corner microstructured surface with channels selected from primary groove channels, structured channels, cube cavity channels, and combinations thereof;
   advancing the tool in a direction such that the channel is substantially parallel to the direction of the advancing tool;
   casting a moldable resin onto said tool surface;
   solidifying the resin farming a retroreflective sheet having a surface comprising cube corner elements; and
   removing the sheet from the tool.

* * * * *

UNITED STATES PATENT AND TRADEMARK OFFICE
CERTIFICATE OF CORRECTION

PATENT NO. : 6,884,371 B2
DATED : April 26, 2005
INVENTOR(S) : Smith, Kenneth L.

It is certified that error appears in the above-identified patent and that said Letters Patent is hereby corrected as shown below:

Column 20,
Line 27, delete "farming" and insert -- forming --, therefor.

Signed and Sealed this

Sixteenth Day of August, 2005

JON W. DUDAS
*Director of the United States Patent and Trademark Office*